May 10, 1927.

O. E. HUNT

MOUNTING FOR CONTROL LEVERS

Filed Aug. 16, 1926

1,627,777

Inventor

Ormond E. Hunt

By Blackmore, Spencer & Phil—

Attorneys

Patented May 10, 1927.

1,627,777

UNITED STATES PATENT OFFICE.

ORMOND E. HUNT, OF DETROIT, MICHIGAN, ASSIGNOR TO GENERAL MOTORS CORPORATION, OF DETROIT, MICHIGAN, A CORPORATION OF DELAWARE.

MOUNTING FOR CONTROL LEVERS.

Application filed August 16, 1926. Serial No. 129,631.

This invention relates to mountings for hand operated control levers particularly adapted for use with spark and throttle levers to control an internal combustion engine for automobiles and the like.

One of the primary objects of the present invention is to provide a simple and inexpensive mounting, of few parts, easy to manufacture and assemble, and unlikely to get out of repair.

A further object of the invention is to provide a neat appearing mounting which will locate the levers at a convenient place, where they will present no interference to other moving parts and the danger of unintentional or accidental operation of the controls will be obviated.

A further object is to provide a simple and improved form of spacer for the parts which will also serve to frictionally resist the operation of the control levers and maintain the levers in their adjusted positions.

In the accompanying drawing, illustrating the preferred, but not necessarily the only embodiment of the invention, Figure 1 is a side elevation partly in section of a portion of an automobile showing the location of the steering column and the spark and throttle control levers, as well as the mounting for the levers;

Figure 1:
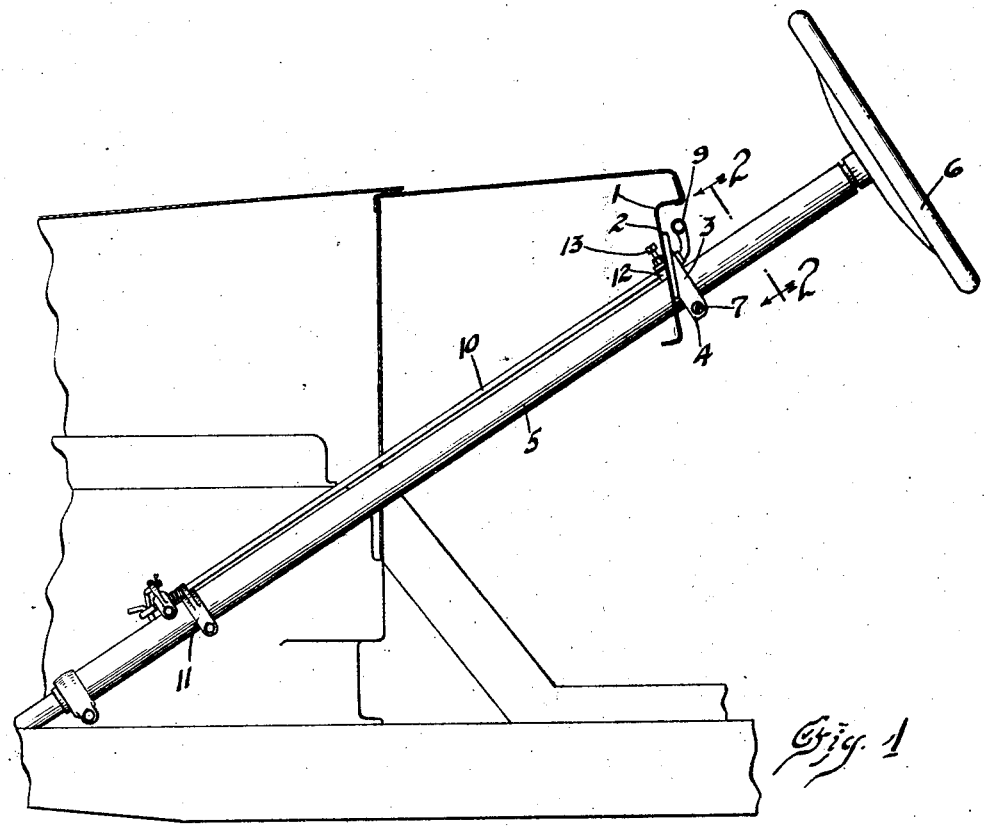
Figure 2:
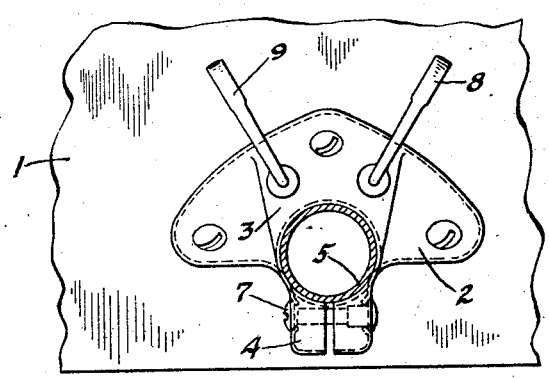
Figure 2 is a front elevation of the mounting located on the instrument panel and taken on line 2—2 of Figure 1.

The present invention contemplates the location of the spark and throttle controls at the instrument panel. Generally, these controls are positioned at the steering wheel either immediately above or beneath the wheel. Due to the fact that such controls are only occasionally used, as when first starting the engine, it is desirable that they be located away from the wheels where there will be no possibility of accidental operation at the time of turning the wheel to control the direction of the automobile. It is of course understood that the spark lever is usually set at one position and very rarely changed or is automatically controlled and that the throttle is almost entirely governed by a foot lever rather than the hand control.

The instrument panel or dash board 1 is shown as constructed of sheet metal, but may be made of wood or other suitable material. Securely fastened to the panel 1 in this instance by a series of screw threaded studs, is a plate or mounting element 2, preferably though not necessarily stamped from sheet metal, and having a central raised portion 3 with a hole therein and terminating in split ears 4. Extending through the instrument panel 1 and the hole in the raised portion 3 of the plate, is located the steering column consisting of a tubular casing 5 and a steering shaft mounted in the casing controlled by the steering wheel 6. The ears 4 are drawn together by means of the screw threaded stud 7 to clamp the plate about the steering column.

Mounted upon the raised portion of the plate 2 are a pair of hand controls or levers 8 and 9, one for the throttle and the other for the spark. Shafts or rods 10 are connected to the control levers and project downwardly in the same general plane as the steering column. The lower ends of these shafts 10 are carried in the mounting 11 clamped to the steering column and are connected respectively to the ignition unit and the carburetor throttle valve in the usual manner.

Figure 3:
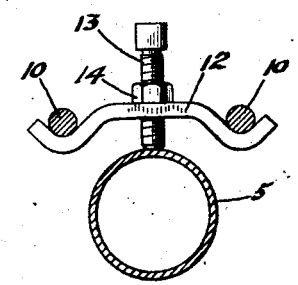
Figure 3 is a transverse section of the steering column showing the relation of the spacer or resistance element.

For the purpose of maintaining the parts in proper spaced relation and to afford a slight frictional resistance to the movement of the shafts 10, there is provided a plate 12, with semi-circular grooves or depressions at each end to engage the sides of the shafts 10. A stud 13 has screw threaded engagement with the plate 12, the end of which bears upon the side of the steering column, as more particularly shown in Figure 3. The adjustment of the screw stud determines the degree of frictional pressure upon the shafts 10, and the locking nut 14 maintains the stud in its adjusted position. This spacer element may be positioned at any point between the mounting plate 2 and the mounting 11, but is preferably located closely adjacent to the plate 2 as shown in Figure 1.

While the parts and arrangement have been described more or less specifically, it is obvious that various modifications may be made without departing from the spirit or scope of the appended claims.

I claim:

1. In a motor vehicle, the combination with an instrument panel and a steering column, of a plate connecting the panel and column, a manually operated lever mounted in said plate, and a work performing shaft extending in a longitudinal plane with said column, and connected with said lever for manual control.

2. In a motor vehicle, the combination of an instrument panel, a plate carried thereby, a steering column fastened to said plate and a spark control lever and a throttle control lever mounted in said plate for manual manipulation.

3. In a motor vehicle, the combination of an instrument panel, a steering column projecting through said panel, a plate connecting the panel and steering column, a pair of levers mounted in said plate, and a pair of shafts governing the spark and throttle respectively, connected at one end with said levers, and extending in parallelism with and mounted at their opposite ends upon the steering column, whereby the movement of said levers operate said shafts to control the motor operation.

4. In a motor vehicle, the combination of a steering column, a pair of shafts governing the throttle and spark respectively, extending in a longitudinal plane with said column, a plate resting against said shafts and an adjustable stud having screw threaded engagement with said plate, and bearing upon the column adapted, when adjusted to exert lateral pressure upon the shafts to frictionally resist their operation.

5. In a motor vehicle, the combination of a steering column, a pair of shafts governing the throttle and spark respectively, and a spacer bracket consisting of a transverse tie member having seating surfaces for the said shafts and an adjustable element carried by said tie and engaging with the steering column to position the shafts in spaced relation with the steering column.

6. In a motor vehicle the combination with a steering column, and an instrument panel, of a plate connecting the column and panel, a pair of levers mounted in said plate, a pair of shafts connected respectively to the said levers and controlling the spark and throttle, said shafts and column extending in substantial parallelism throughout their length, a transverse tie member between the shafts adjacent the panel and a stud having screw threaded engagement with said tie member and bearing on said column, the adjustment of which spaces the shafts and columns and offers frictional resistance to the operation of the shafts.

In testimony whereof I affix my signature.

ORMOND E. HUNT.